(12) United States Patent  
Lahti et al.

(10) Patent No.: US 8,680,809 B2
(45) Date of Patent: Mar. 25, 2014

(54) BATTERY CHARGER

(75) Inventors: Tero Juhani Lahti, Pa imio (FI); Timo Tapani Toivola, Turku (FI); Heikki Olavi Suuronen, Salo (FI); Per Brickstad, Helsinki (FI); Kalevi Antero Salo, Salo (FI)

(73) Assignee: Nokia Corporation, Espoo (FI)

( * ) Notice: Subject to any disclaimer, the term of this patent is extended or adjusted under 35 U.S.C. 154(b) by 361 days.

(21) Appl. No.: 13/162,317

(22) Filed: Jun. 16, 2011

(65) Prior Publication Data

US 2012/0013291 A1    Jan. 19, 2012

Related U.S. Application Data

(60) Provisional application No. 61/356,121, filed on Jun. 18, 2010.

(51) Int. Cl.
    *H02J 7/00* (2006.01)
(52) U.S. Cl.
    CPC ............. *H02J 7/0042* (2013.01); *H02J 7/0044* (2013.01)
    USPC ............................ 320/107; 320/113; 320/115
(58) Field of Classification Search
    CPC ............................... H02J 7/0042; H02J 7/0044
    USPC .......................................................... 320/107
    See application file for complete search history.

(56) References Cited

U.S. PATENT DOCUMENTS

| 4,527,110 | A  | * | 7/1985 | McCarty et al. | ............... | 320/111 |
| 5,035,024 | A  | * | 7/1991 | Steiner et al. | ................... | 15/339 |
| 6,346,793 | B1 | * | 2/2002 | Shibata et al. | ................ | 320/113 |
| 7,332,889 | B2 | * | 2/2008 | Glasgow et al. | .............. | 320/107 |
| 8,482,252 | B2 | * | 7/2013 | Byrne | .......................... | 320/115 |
| 2003/0162084 | A1 | * | 8/2003 | Shigeta et al. | .................. | 429/62 |
| 2007/0069689 | A1 | * | 3/2007 | Shum | ............................. | 320/114 |
| 2008/0143294 | A1 |   | 6/2008 | Phelps et al. | | |
| 2009/0033278 | A1 |   | 2/2009 | Ludtke | | |

FOREIGN PATENT DOCUMENTS

JP    2006025532 A    1/2006

OTHER PUBLICATIONS

Singapore Search Report for application No. 2011-04455-9 issued Nov. 11, 2011.
Singapore Written Opinion for application No. 2011-04459 issued Nov. 11, 2011.
Office Action received in corresponding CN Application No. 201110168706.5 dated Jun. 4, 2013.

* cited by examiner

*Primary Examiner* — M'Baye Diao
(74) *Attorney, Agent, or Firm* — Banner & Witcoff, Ltd

(57) ABSTRACT

A battery charger includes a rotatable top cover for exposing electrical connectors for physically coupling and electrically communicating with a battery or other device and providing electrical energy for charging a battery or device.

11 Claims, 7 Drawing Sheets

BATTERY CHARGER

CROSS-REFERENCE TO RELATED APPLICATIONS

The present application is non-provisional of U.S. Provisional Application No. 61/356,121 filed Jun. 18, 2010; the contents therein are incorporated by reference.

FIELD OF THE INVENTION

Aspects of the present invention relate to a multiple position battery charger.

BACKGROUND

The popularity of portable electronic devices allow users to work and play free of restrictive power cords and chargers for a limited period of time. As people work outside of their traditional office, they often find themselves using their notebook computers, cellular phones, digital assistants and tablet computers. Similarly, people enjoying themselves away from the home take advantage of portable music players, digital cameras, electronic game systems and the like while on travel or doing outdoors activities. In some countries it is very common to use separate spare battery for mobile phone and change it if a first battery is discharged during the day.

Rechargeable batteries are used for portable electronic devices, such as portable computing systems, video cameras, and mobile phones. While users attempt to operate with the freedom of mobile computing, there are still basically tethered to the power cable. The users must think about how much power is available for mobile use. This time period is limited to the type of battery and other factors.

Charging is possible with phone, but battery needs to be replaced during second battery charging. This is not convenient especially on night time charge. Different phone models use a myriad of battery types with different dimensions and two totally different connection interfaces, this is challenge to cope with one charger model.

In view of the foregoing, what is needed is an apparatus and method to support battery an environment for the new media technologies and productivity activities for mobile electronic devices.

SUMMARY OF THE INVENTION

Aspects of the present invention pertain to a battery charger and a method of charging a battery. In one aspect, a battery charger includes a rotatable top cover for exposing electrical connectors for physically coupling and electrically communicating with a battery or other device and providing electrical energy for charging a battery or device. In one aspect, the charger includes a temperature sensor to measure the temperature characteristic of the battery or device.

In one arrangement, the slot opening includes a latch to place a biasing force to the device. In another arrangement, the latch includes a temperature sensor for monitoring a temperature characteristic of a battery or device being charged and disposed in a charging slot. In yet another arrangement, a plurality of electrical connectors is disposed on inclined surface of the base portion. In another arrangement, the electrical connectors are radially disposed around the base portion. In one configuration, the top cover has a snap-fit arrangement with the base portion to provide rotation of the top cover.

The above and other aspects, features and advantages of the present invention will be readily apparent and fully understood from the following detailed description illustrative embodiments in conjunction with the accompanying drawings, which are included by way of example, and not by way of limitation with regard to the claimed invention.

DETAILED DESCRIPTION

Charging System Environment

Figure 1:
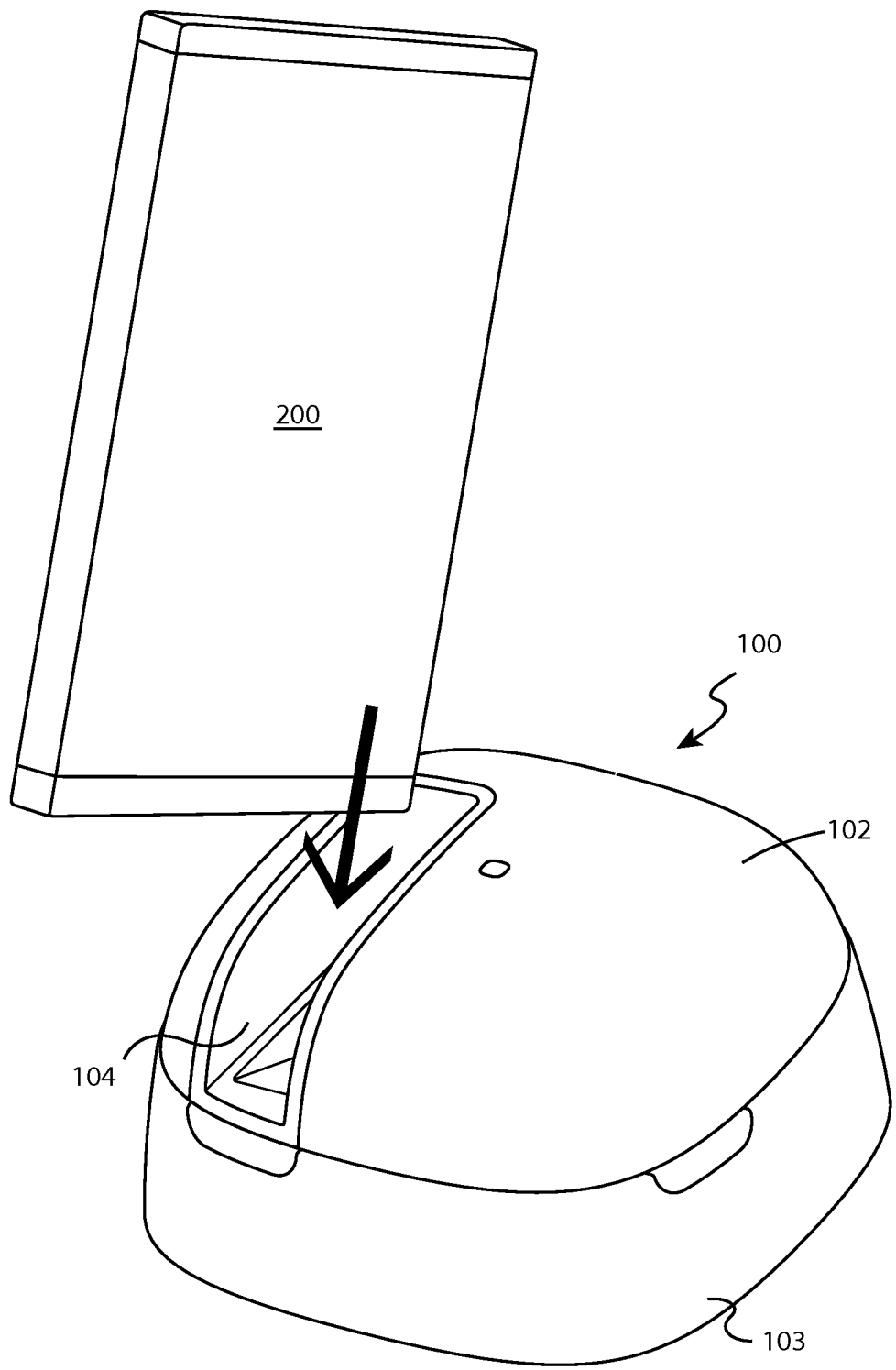
FIG. 1 is a schematic representation of a charging system according to one or more aspects of the present invention.
Figure 2:
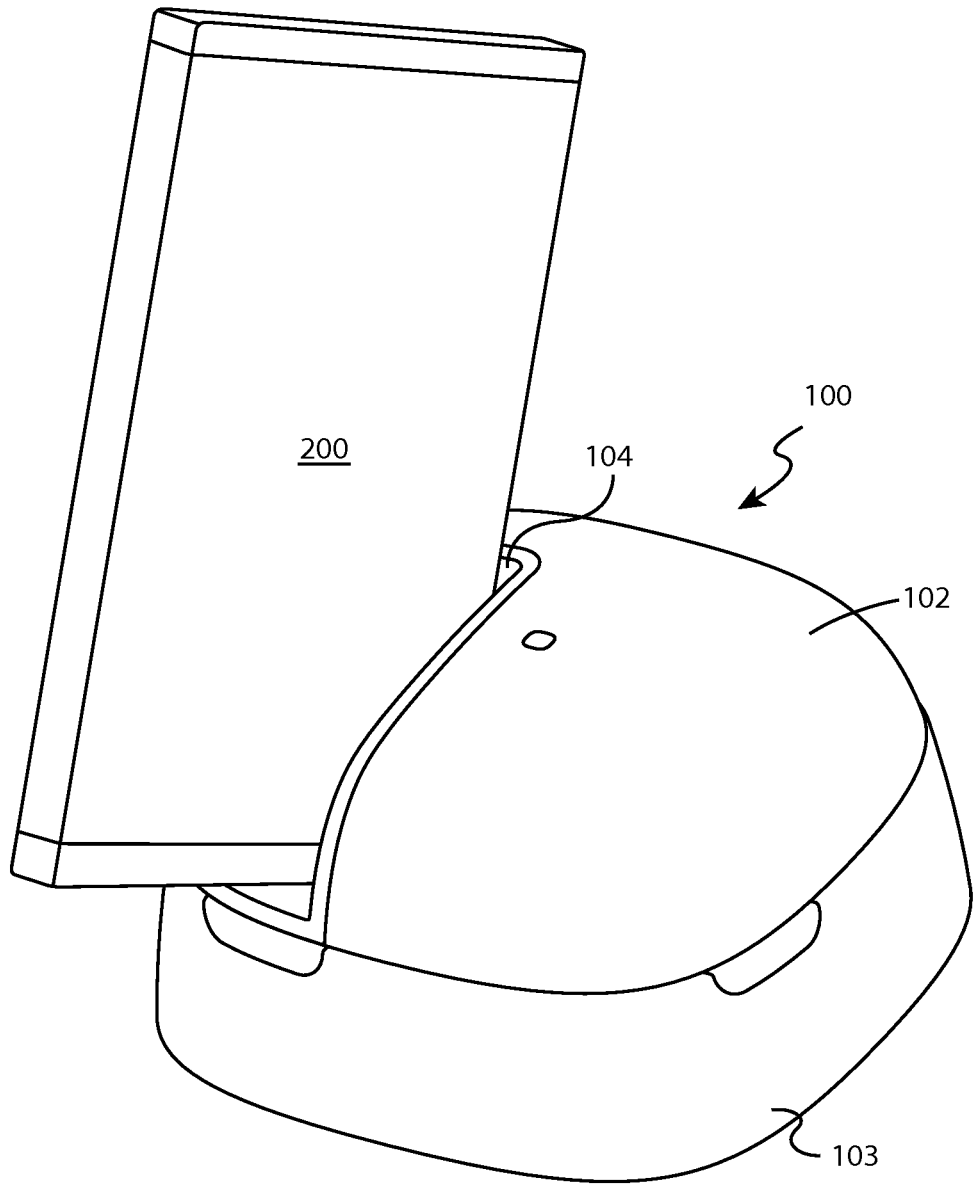
FIG. 2 is a schematic representation of a charging system according to one or more aspects of the present invention.

It may be helpful to briefly discuss the components and operation of a charging system environment on which various aspects of the present invention may be implemented. Accordingly, charging system arrangements with respect to one or more aspects of the present invention are shown in FIGS. 1-10. Referring to FIGS. 1 and 2, charging system 100 has a rotating top cover 102 with one slot 104 configured to accept a battery 200. The battery 200 may be any battery chemistry, such as NiMH (Nickel-Metal Hydride), Li+ (lithium-ion), or NiCd (nickel-cadmium), Li-Polymer, and other battery formulations. Battery charging system may include housing for enclosing the electrical components therein. The battery charging system may be implemented in any appropriate shape and in a number of form factors, as well as any number of stand or dock-type charger configurations.

Referring to FIGS. 3-6, below top cover 102, there is provided two different interfaces 106 and 108 for charging batteries 200. The interfaces 106 and 108 are disposed on a base 103. The interfaces have metal electrical tabs 130 to physically abut electrical plates/connectors (not shown) on the battery 200. Interface 106 has prismatic tabs extending upwardly. Interface 108 includes circular wire connector extending upwardly. Interfaces 106 and 108 on base 103 have annular arrangement or inclined arrangement with respect to the horizontal. This angular arrangement allow enables the battery 200 to slide into the slot 104 and allow for earth's gravity to pull the battery 200 against the electrical tabs 130. In a construction, the angle of incline may be in a range from 5 to 70 degrees or other desired values.

In operation, a user selects a desired interface 106 or 108 by rotation and then slides battery 200 to the slot 104. Top cover 102 rotates with respect to the base 103. Top cover 102 slot 104 locks battery 200 firmly to connector interfaces 106 and 108 and against the sidewalls of slot 104. Top cover 102 locking latch 300 press battery always on right position no matter battery thickness. In one construction, the locking latch 300 includes a biasing member, such as a spring. While charging system has application to battery charging direct connection, the system concept could be used to expose different type of electrical male-female connections arrangements as the top cover 102 is rotated with respect to the base 103. For example, the different electrical positions on the base 103 may have the micro-USB connector, or a micro 2 mm power plugs. In one construction, the locking latch 300 includes a biasing member, such as a spring.

Figure 10:
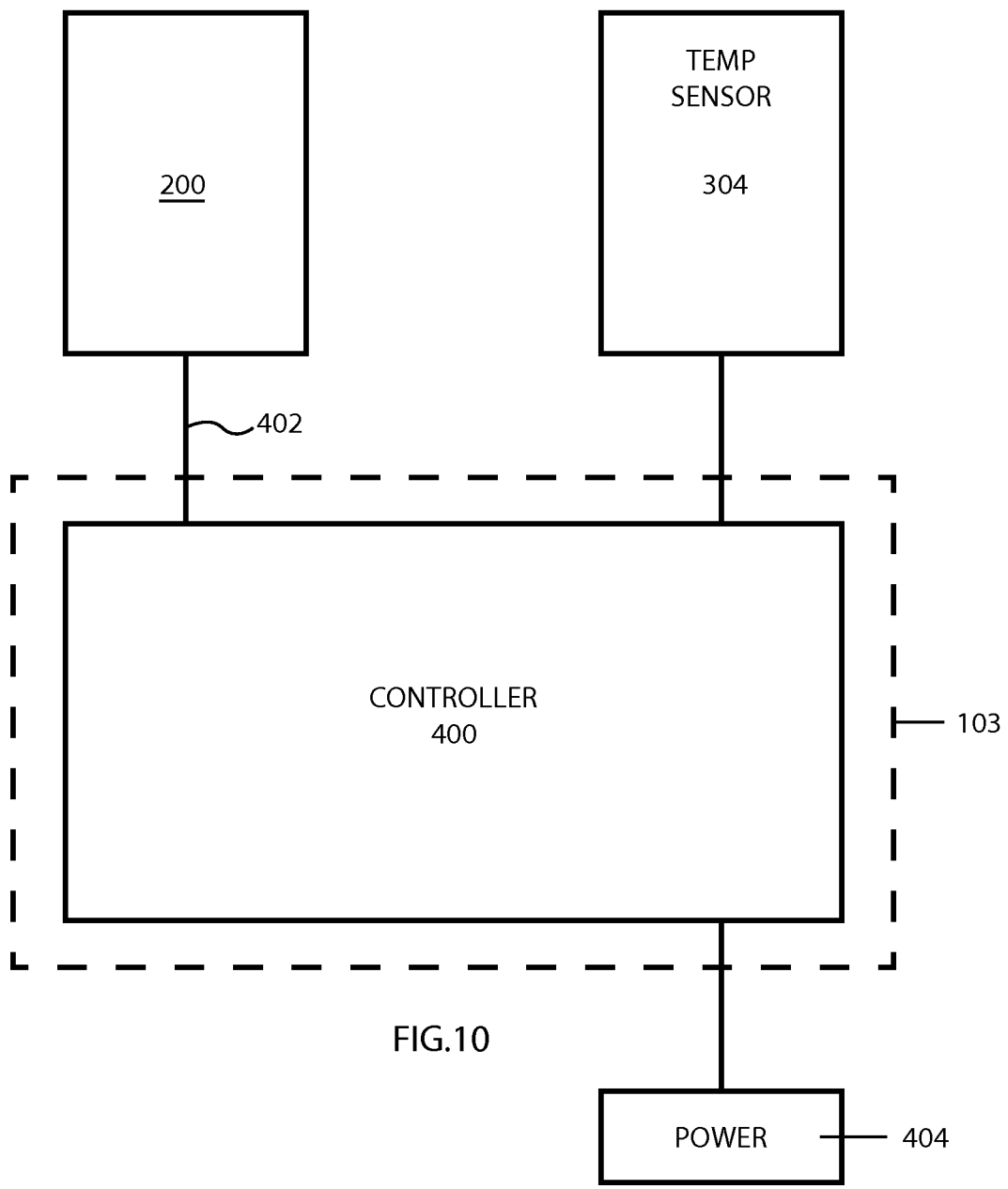
FIG. 10 is a functional block diagram of a charging system according to one or more aspects of the present invention.

In one construction, latch 300 contains a temperature sensor arrangement to detect battery temperature on real time according battery temperature limits (See FIG. 10).

Figure 3:
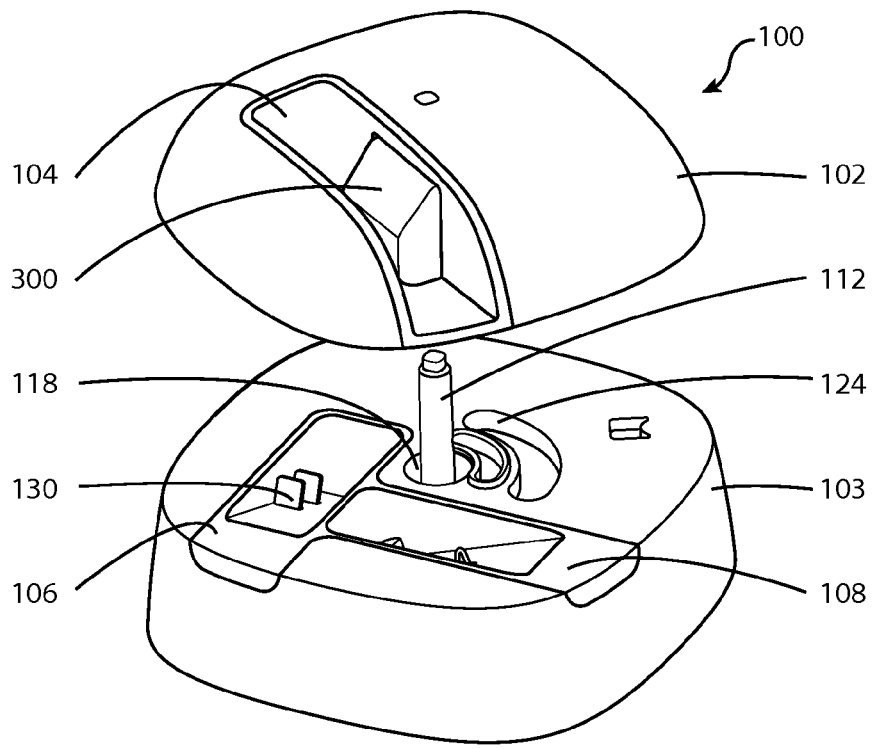
FIG. 3 is an exploded diagram of a charging system according to one or more aspects of the present invention.
Figure 4:
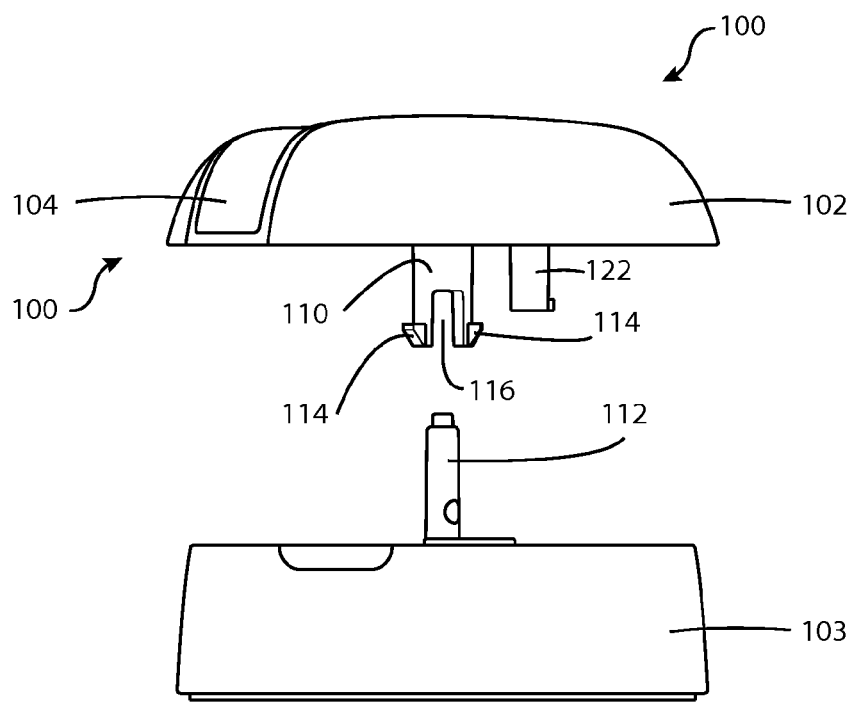
FIG. 4 is an exploded diagram of a charging system according to one or more aspects of the present invention.
Figure 5:
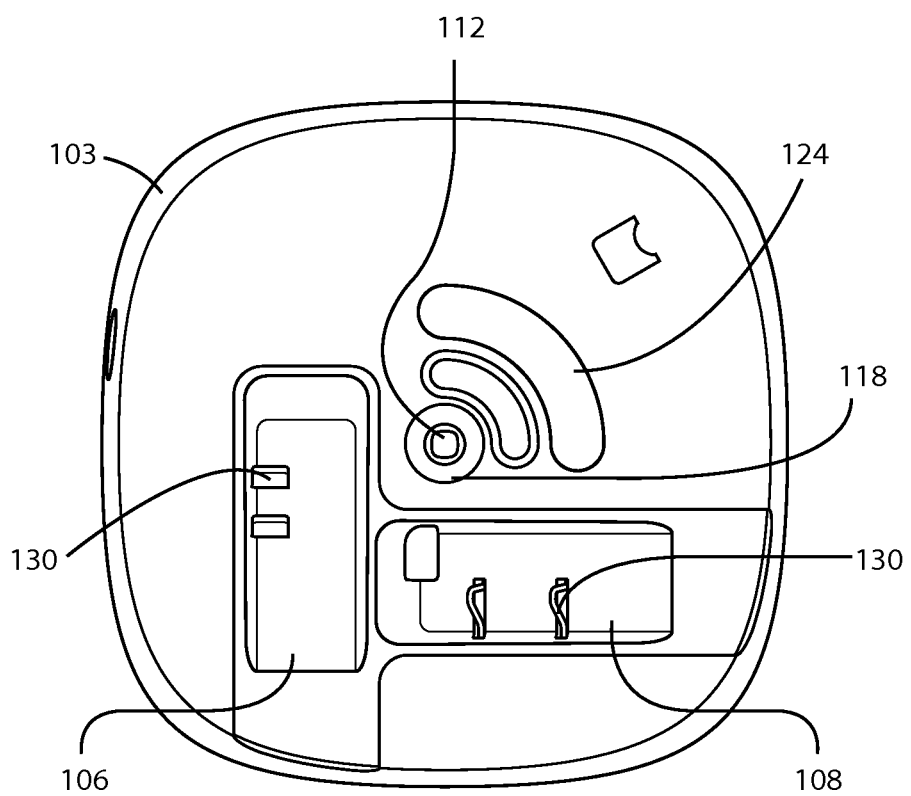
FIG. 5 is a diagram of a base portion of a charging system according to one or more aspects of the present invention.
Figure 6:
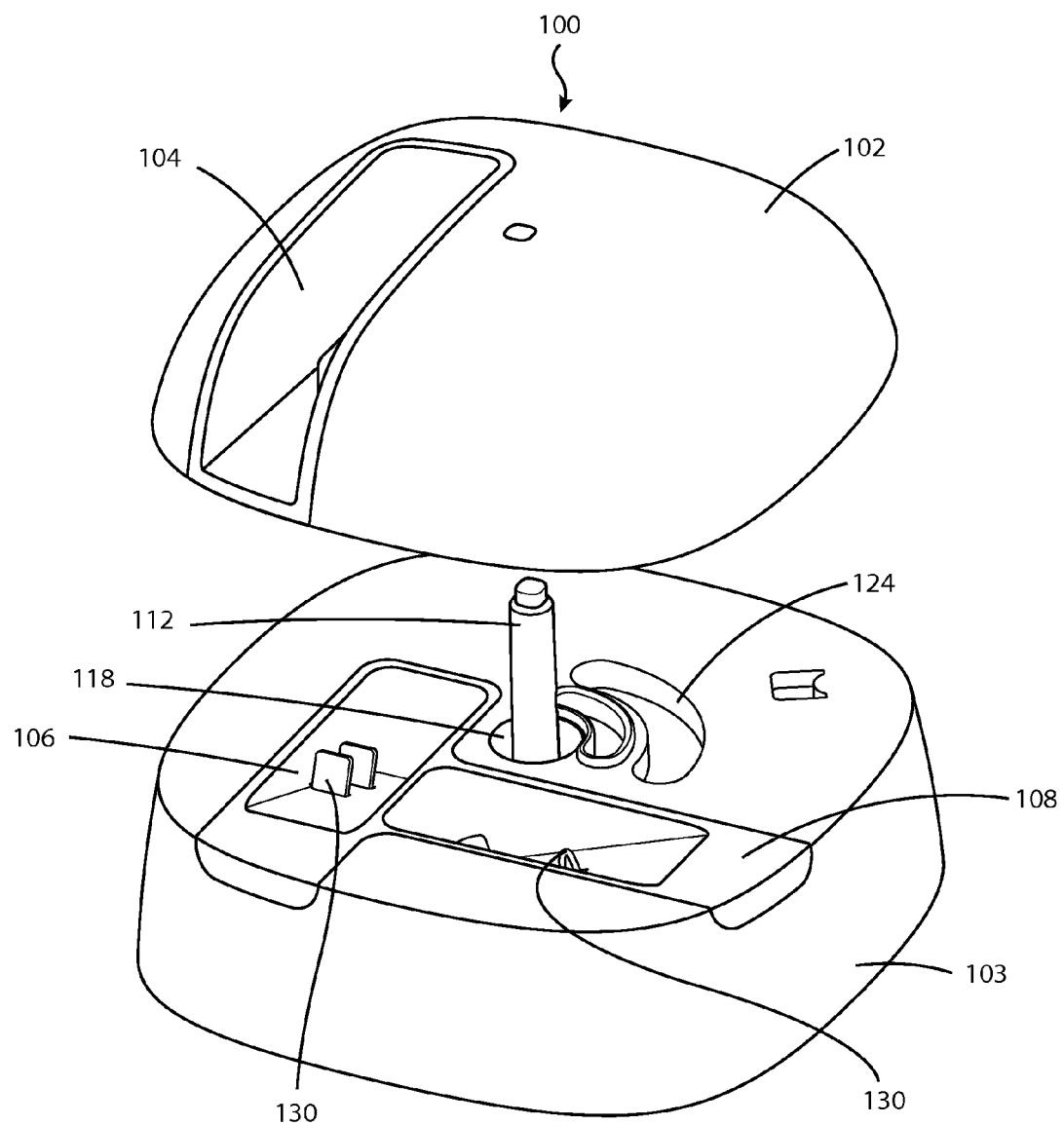
FIG. 6 is an exploded diagram of a charging system according to one or more aspects of the present invention.

Referring to FIGS. 3-4, the top cover 102 connects to the base 103 by way of a snap-fit construction. Top cover 102 includes a downwardly depending tube 110 having a hollow interior which receives a stem 112 disposed on the base 103. Stem 112 extends upwardly from the base 103. Tube 110 includes tabs 114 disposed at a notched distal end of tube 110. The notches 116 of tube 110 create a leaf spring arrangement to enable the tabs 114 to snap-fit into a circular slot 118 of base 103. When the top cover 102 is connected to the base 103, the tabs 114 are disposed in slot 118. To enable rotation between the two interfaces 106 and 108, top cover 103 includes a guidance pin 122 which extends into curved slot 124 on base 103. The distal end 124 of guidance pin 122 may include a connector to connect below into slot 124 so as to provide electrical signals for the temperature sensor associated with latch 300.

Figure 7:
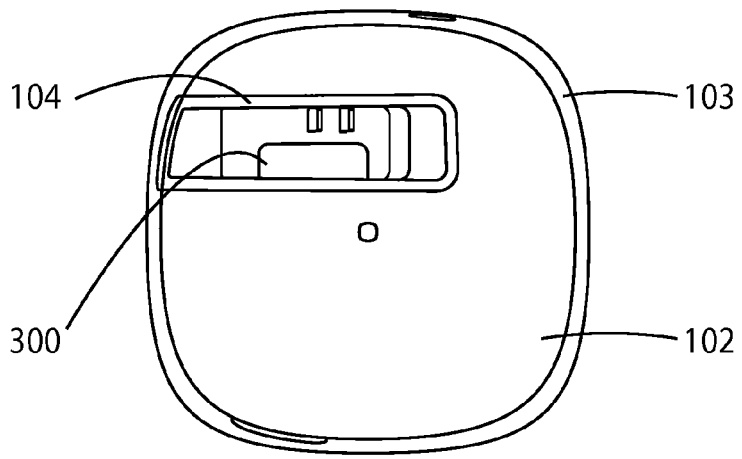
FIGS. 7-9 are top view diagrams showing different rotatable positions of a charging system according to one or more aspects of the present invention.
Figure 8:
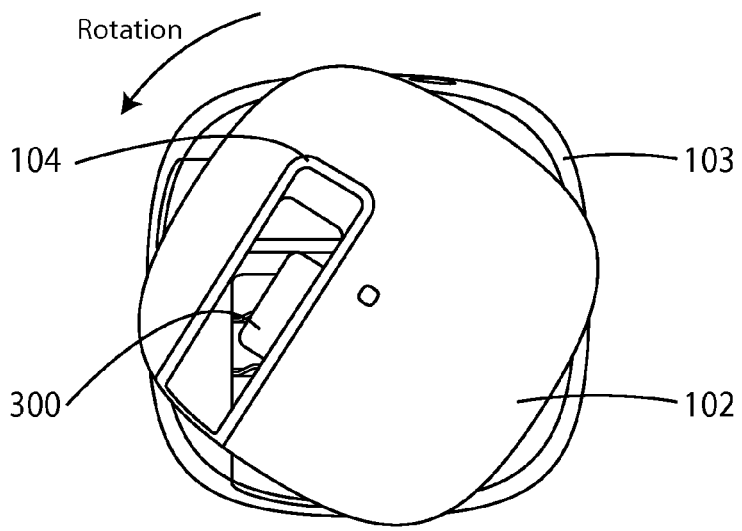
Figure 9:
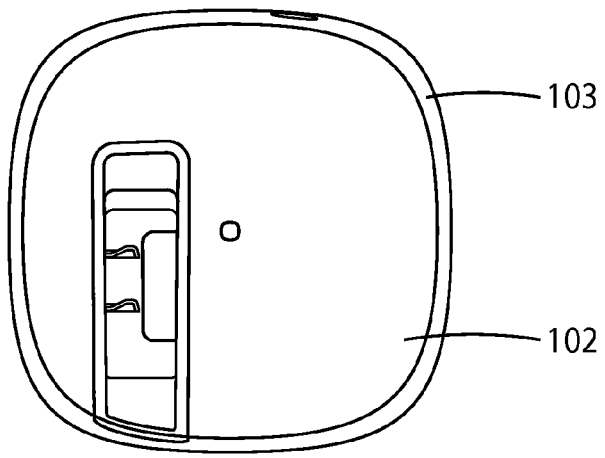

As shown in FIGS. 7 through 9, the top cover 102 can be place in charging position number 1 to accept one type of battery charging connectors. FIG. 8 shows an intermediate position while the top cover is rotated counter-clockwise towards charging position 2 to accept another type of battery charging connector. FIG. 9 shows charging position 2 to enable electric charging of a different battery. In this construction, the different rotatable position of interfaces 106 and 108 are disposed 90 degrees from each other. It should be recognized that charging system may have multiple interfaces for charging. And the interfaces can be disposed at different radial positions on the base 103. Hence, top cover 102 can be rotated into an incrementally desired position for charging battery or connecting with other devices. The rotation of top cover 102 could be counter-clockwise or clockwise, as desired. In several constructions, the electrical interfaces could be disposed every 30 degrees or 45 degrees or other values.

FIG. 10 is a functional block diagram of one arrangement of a charging system. A temperature sensor 304 may be disposed within latch housing 300 for monitoring the temperature of the battery 200. Nevertheless, the temperature sensor 304 can be disposed outside of the latch 300 or within the slot 104, such as on sidewalls or on the incline of base 103. Temperature information is provided to a controller 400 for charging the battery 200. A temperature sensor 304 arrangement to detect battery temperature on real time according battery temperature limits. Once the temperature is measured to the designated battery temperature, the electric power is stopped. In one example, the designated temperature maybe between 40 degrees C. to 55 degrees C. The microprocessor controller 400 for charging system 100 may include a communications pathway 402 with an appropriate battery connector for interaction with the battery 200. The controller 400 may have associated computer-readable media provide non-volatile storage of computer readable instructions, data structures, program modules, and other data.

The computer readable media may be read only memory (ROM). In one arrangement, controller 400 may be implemented with one or more features of a System Management Bus (SMbus). In one arrangement, the communication pathway 402 may be configured as such a System Management Bus (SMbus). The pathway 402 can be used to inform controller 400 as to a wide range of information about the battery 200, e.g., current, voltage, power requirements, and rated capacity. The SMBus is a two-wire interface system. One wire handles the data transfer; and the other wire pertains to the clock. An example of a SMbus and functions are described in the System Management Bus Specification Revision 2.0 standard available from the SBS Implementers Forum and noted SMB standard is hereby incorporated by reference.

Referring to FIG. 10, the charging system is electrically connected to an alternating current power source 404, such as utility electrical power and the like. In such an arrangement, a charging source may include a power supply that receives electric energy via the conventional method of a cord physically coupled to a standard wall electrical outlet (not shown) for 60 Hz, 120 volt power, or alternatively, 50 Hz at 230 volts and other frequency/voltage combinations. Nevertheless, a direct current arrangement is possible. For example, direct current arrangements may include automobile cigarette lighter plug configuration, such as male plug is received a female connector. Other Direct current arrangements include, power from solar power cells, dynamo power from a bicycle and other alternative power arrangement.

The charging system provides a more flexible and adaptable solution for persons or organizations with different electronic devices. The multiple battery assemblies may have different power requirements and connector arrangements that can be handled. The charging system can supports more than 20 or more battery types with different sizes and capacities.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. An apparatus, comprising:
a top cover having a slot opening;
a base portion having at least two electrical connectors, wherein the top cover is rotatable so that the slot opening is positionable between the two electrical connectors to expose one of them to accept a device in a charging position, while the other of the electrical connectors is placed in an unexposed non-charging position by the top cover; and
a controller disposed in the base portion to control electrical power to the device while the device is disposed in the slot opening in the charging position;
wherein the electrical connectors are disposed on inclined surface of the base portion for the device to be slidably disposed towards an inner portion of the base portion and towards each other.

2. The apparatus according to claim 1, wherein the slot opening includes a latch to place a lateral biasing force to the device.

3. The apparatus according to claim 2, wherein the latch includes a temperature sensor.

4. The apparatus according to claim 1, wherein the device comprises a battery.

5. The apparatus according to claim 1, wherein the electrical connectors are radially disposed around the base portion.

6. The apparatus according to claim 1, wherein the top cover has a snap-fit arrangement with the base portion to provide rotation of the top cover.

7. An apparatus, comprising:
- a top cover having a slot opening having sidewalls extending therefrom;
- a base portion having at least two electrical connectors, wherein the top cover is rotatable so that the slot opening is positionable between the two electrical connectors to expose one of them to accept a battery in a powering position, while the other of the electrical connectors is placed in an unexposed non-powering position by the top cover, wherein the electrical connectors are disposed on inclined surface of the base portion for the battery to be slidably disposed towards an inner portion of the base portion and a portion of the sidewalls;
- a controller disposed in the base portion to control electrical power to the battery while the battery is disposed in the slot opening in the powering position;
- and a biasing device in the slot opening; wherein the biasing device is configured to apply a lateral force to the battery to abut the battery against a portion of the sidewalls.

8. The apparatus according to claim 7, wherein the biasing device comprises a leaf-spring.

9. The apparatus according to claim 7, wherein the electrical connectors are radially disposed around the base portion.

10. The apparatus according to claim 7, wherein the top cover has a leaf spring stem for providing a snap-fit arrangement with the base portion.

11. The apparatus according to claim 7, wherein the biasing device further comprises a temperature sensor for monitoring a temperature of the battery while in the powering position.

* * * * *